United States Patent [19]

Gunesin et al.

[11] Patent Number: 5,654,361
[45] Date of Patent: Aug. 5, 1997

[54] PLASTISOLS CONTAINING ANIONIC POLYMERS

[75] Inventors: Binnur Gunesin, Neuchatel, Switzerland; Johannes Dobbelaar, Wachenheim, Germany; Uwe Dittrich, Ludwigshafen, Germany; Joachim Krobb, Landau, Germany

[73] Assignee: BASF Aktiengesellschaft, Ludwigshafen, Germany

[21] Appl. No.: 436,529

[22] Filed: May 8, 1995

[30] Foreign Application Priority Data

May 10, 1994 [DE] Germany .................. 44 16 478.5

[51] Int. Cl.⁶ .................. C08L 25/10; C08L 25/16
[52] U.S. Cl. .................. 524/577; 524/147; 524/295; 524/296; 524/297; 524/306; 524/308; 524/310; 524/313; 524/314; 524/457; 524/553; 524/575; 524/578; 524/923; 526/346
[58] Field of Search .................. 526/173, 340, 526/346; 524/575, 577, 923, 295, 457, 296, 297, 578, 147, 306, 308, 310, 314, 313, 553

[56] References Cited

U.S. PATENT DOCUMENTS

| | | | |
|---|---|---|---|
| 3,041,312 | 6/1962 | Boyd | 526/173 |
| 3,684,761 | 8/1972 | Stampa | 524/923 X |
| 5,331,036 | 7/1994 | Kang et al. | 526/173 X |
| 5,395,902 | 3/1995 | Hall | 526/201 |

*Primary Examiner*—Fred Teskin
*Attorney, Agent, or Firm*—Oblon, Spivak, McClelland, Maier & Neustadt, P.C.

[57] ABSTRACT

Polymer prepared by anionic polymerization and having a number average molecular weight of from 300,000 to 10,000,000 contain, as components, from 10 to 100% by weight of an ethylenically unsaturated vinyl-aromatic a), from 0 to 90% by weight of an aliphatic diene having two conjugated double bonds b) and from 0 to 30% by weight of further ethylenically unsaturated monomers c).

18 Claims, No Drawings

PLASTISOLS CONTAINING ANIONIC POLYMERS

The present invention relates to polymers prepared by anionic polymerization and having a number average molecular weight from 300,000 to 10,000,000, containing, as components, from 10 to 100% by weight of an ethylenically unsaturated vinyl-aromatic a)

from 0 to 90% by weight of an aliphatic diene having two conjugated double bonds b) and from 0 to 30% by weight of further ethylenically unsaturated monomers c).

Plastisols are liquid to pasty mixtures which usually contain a polymer and a plasticizer. Plastisols should as far as possible have a long shelf life at room temperature, ie. in particular they do not gel prematurely and thus lose their flowability. A homogeneous, gelled mixture which is applied, for example, as a coating material or sealing compound and which no longer loses the homogeneous quality after cooling is formed only on heating to the temperature of use, which is generally above 100° C.

Plastisols disclosed to date, for example in EP-A-261 499 and WO-A-92/07906, contain polymers which are prepared by free radical polymerization, in particular emulsion polymerization.

Disadvantages of the plastisols described are often an insufficient shelf life, in particular premature gelling.

The performance characteristics of novel plastisols should correspond as far as possible to those of plastisols known to date and based on polymers containing polyvinyl chloride or acrylonitrile.

It is an object of the present invention to provide plastisols which have a long shelf life and satisfactory performance characteristics, such as great hardness and good resilience.

We have found that this object is achieved by the polymers defined at the outset and plastisols which contain these polymers.

Preferred embodiments of the invention are described below.

The polymer prepared by anionic polymerization contains, as components, preferably from 50 to 100, particularly preferably from 80 to 100, very particularly preferably from 90 to 99, % by weight of the compounds a), from 0 to 30, particularly preferably from 0 to 20, very particularly preferably 1 to 10, % by weight of compounds b) and from 0 to 20, particularly preferably from 0 to 10, very particularly preferably from 0 to 9, % by weight of the compounds c), based in each case on the polymer.

The ethylenically unsaturated vinylaromatics a) are in particular those of up to 20 carbon atoms., such as styrene, α-methylstyrene, 3-methylstyrene, 4-n-propylstyrene, 1-vinylnaphthalene and 2-vinylnaphthalene. Styrene is particularly preferred.

Suitable aliphatic dienes b) are in particular those of 4 to 12, particularly preferably 4 to 8, carbon atoms. Examples are isoprene, 2,3-dimethyl-1,3-butadiene, piperylene, 3-butyloctadiene and particularly preferably butadiene.

Further compounds c), which may, if required, be copolymerized, are, for example, crosslinking compounds having at least 2, preferably 2, nonconjugated double bonds.

Crosslinking compounds may be present, for example, in amounts of from 0 to 10, particularly preferably from 0 to 5, % by weight, based on the polymer.

An example of a crosslinking compound is divinylbenzene.

The polymer may furthermore contain as compounds c), for example, ethylenically unsaturated compounds having functional groups, such as carboxyl, hydroxyl, thiol or primary or secondary amino.

The abovementioned functional groups may also be introduced into the copolymer by using suitable ethylenically unsaturated compounds which can then be functionalized by appropriate reactions.

One carboxyl group per chain end can be introduced in a specific manner if the living polymer is first modified at the terminal groups with one equivalent of 1,1-diphenylethylene, then reacted with $CO_2$ and worked up under protic conditions. Any number of terminal carboxyl groups can be incorporated via the block copolymerization with tert-butyl methacrylate. For this purpose, a 1,1-diphenylethylene-modified, living polymer is reacted with the desired number of equivalents of tert-butyl methacrylate at from −20° to 60° C., and isobutene is eliminated from the poly-tert-butyl methacrylate block, either thermally at from 180° to 200° C. or under acidic catalysis with, for example, 0.1 equivalent of p-toluenesulfonic acid per equivalent of tert-butyl methacrylate at from 80° to 100° C., with formation of polymethacrylic acid.

Hydroxyl terminal groups can be introduced directly by reacting the living polymer with ethylene oxide or propylene oxide, for example to give the lithium alcoholate, and subsequently carrying out working-up under protic conditions, for example with alcohols or water. An interesting variant is the reaction of the carbanionic chain ends with oligoepoxides, such as the tetraglycidyl ether of pentaerythritol, equimolar amounts being preferred. The remaining epoxy groups can then be opened with ammonia or primary or secondary amines with the formation of the corresponding ethanolamines.

Amino terminal groups can be introduced by reacting the living polymer with imines, such as benzylideneaniline and its derivatives alkylated in the nucleus and benzylidenetrimethylsilylamine to give the amide and subjecting the product to protolysis to give the secondary or primary amine. The amines may be further reacted with epoxides and anhydrides to give ethanolamines and amides, respectively. By using di- or oligoanhydrides such as pyromellitic anhydride or copolymers of maleic anhydride in a molar ratio of 1:1, anhydride-terminated polymers are obtainable.

In addition to the crosslinking compounds and those having functional groups, other ethylenically unsaturated compounds c) capable of undergoing anionic copolymerization may also be present.

The preparation of polymers by anionic polymerization is known per se. High molecular weights can be obtained by processes as described in U.S. Pat. No. 4,871,814, U.S. Pat. No. 4,942,209 and U.S. Pat. No. 4,985,505. In these processes, the anionic polymerization is carried out in an inert liquid in which the polymer obtained is insoluble. For example, aliphatic hydrocarbons, including those having a double bond, are suitable. Aliphatic hydrocarbons of 4 to 7 carbon atoms, such as butane, isobutane, pentane, isopentane, hexane, heptane, 2,2-dimethylbutane, butene, pentene or petroleum ether, are preferred. In this process, emulsions of the anionically polymerized polymer are generally obtained.

The number average molecular weight $M_n$ of the polymer is from 300,000 to 10,000,000, preferably from 700,000 to 5,000,000, particularly preferably from 600,000 to 3,000,000.

The molecular weight distribution is narrow and is preferably characterized by a dispersity $M_w/M_n$ of less than 1.5

The molecular weight $M_n$ is determined by gel permeation chromatography, a mixed standard corresponding to the polystyrene content and polybutadiene content of the sample being prepared from a polystyrene standard and, if required, a polybutadiene standard from Polymer Laboratories (cf. G. Glöckner, Polymercharakterisierung durch Flüssigkeitschromatographie, Heidelberg 1982). The measurement was carried out using a 0.25% strength by weight solution in tetrahydrofuran at 23° C. and at a flow rate of 1.2 ml/min.

The number average particle size of the polymer is preferably from 1 to 250 μm.

Examples of suitable catalysts for the anionic polymerization are lithium organyls of the type $R(Li)_n$, where R is an aliphatic, cycloaliphatic, aromatic or alkyl-substituted aromatic n-valent hydrocarbon radical and n is an integer from 1 to 10. Examples of such lithium organyls are methyllithium, ethyllithium, n-propyllithium, i-propyllithium, n-butyllithium, sec-butyllithium, tert-butyllithium, phenyllithium, benzyllithium, 1,4-dilithiobutane, 1,4-dilithio-1,1,4,4-tetraphenylbutane and derivatives thereof alkylated in the nucleus and 1,4-dilithio-2,3-dialkyl-1,4-diphenylbutane, where alkyl is, for example, methyl, ethyl, propyl, butyl, hexyl, heptyl, octyl, isooctyl, etc. Dilithiostilbene and dilithiodiphenylacetylene are also suitable. Sodium naphthalene and derivates thereof are also useful. n-Butyllithium and sec-butyllithium are preferred initiators.

The catalyst is preferably used in amounts of from $10^{-1}$ to $10^{-4}$ mol per 100 g of the compounds a) to c).

The polymerization temperature may be, for example, from 0° to 100° C., preferably from 0° to 40° C.

The polymer may have a random structure or, for example, may contain monomer blocks. For example, the toughness increases with increasing number of monomer blocks, while a random structure promotes the flexibility of the polymer.

Random copolymerization can be achieved, for example, when a mixture of a vinylaromatic and a conjugated diene is added so slowly that the monomers react continuously and no monomer accumulates.

Random copolymerization can be achieved in a known manner also by adding modifiers, for example tetrahydrofuran.

The polymer preferably has a random structure.

The solids content of the emulsion obtained is preferably from 20 to 70% by weight.

The novel polymer is suitable for the preparation of plastisols which contain a plasticizer in addition to the polymer.

Examples of suitable plasticizers are esters of phthalic, adipic, sebacic, azelaic, citric and phosphoric acid, chlorohydrocarbons, liquid polyesters and epoxidized natural oils, such as linseed oil or soybean oil.

The above esters and diesters are preferred, in particular diesters of phthalic acid with alcohols of 1 to 20 carbon atoms, preferably $C_1-C_{20}$-alkanols.

Examples are alkyl phthalates, such as dibutyl phthalate, dioctyl phthalate, diisononyl phthalate, butyl benzyl phthalate, diisodecyl phthalate and dibenzyl phthalate.

The plasticizers preferably have a boiling point above 150° C. at 1 bar. At room temperature, the polymer does not dissolve in the plasticizer at room temperature; it is only at elevated temperatures, in particular above 150° C., that the mixture of plasticizer and polymer gels to give a homogeneous mass, which retains its homogeneous quality even after cooling.

The plastisol contains the plasticizer preferably in amounts of from 5 to 300, particularly preferably from 50 to 150, % by weight, based on the polymer.

The plastisols may contain further assistants and additives, such as fillers, pigments, viscosity regulators, adhesion promoters, antioxidants, etc. Organic solvents may also be added to the plastisols for dilution and hence for improved processing. Diluents usually escape when the temperature is increased and do not promote gelling of the plastisol.

The plastisols can be prepared by conventional methods, by mixing the polymer or an emulsion thereof with the plasticizer and, if required, further components (see above). If the polymer is used in the form of its emulsion, the dispersing medium may simultaneously serve as a diluent.

The novel plastisols have a very long shelf life at room temperature and possess good performance characteristics.

They can be used for example, as adhesives, coating materials or sealing compounds, for example as underbody protection in vehicle construction, for sealing sea/as in body construction and for sealing flange folds in the production of parts (doors, engine hoods, trunk covers).

EXAMPLE

Batch:
1859 g of n-hexane
950 g of styrene
50 g of butadiene
25 g of dispersant (Nippon NS 312)
10 ml of tetrahydrofuran
2.8 ml of butyllithium
10 ml of dry ethanol.

The dispersant was dissolved in styrene and initially taken with n-hexane, tetrahydrofuran and butadiene. The initially taken mixture was pretitrated with 2.1 ml of butyllithium. The reaction was carried out at 61° C. After 1 hour, 10 ml of ethanol were added and the mixture was cooled. The polymer was filtered off with suction and dried at 65° C.
$M_n$ (by GPC): 1,345,900
Mean particle size of the dispersed particles 10 μm.

Comparative Example to WO-A-92/07906

5 kg of water, 19 g of emulsifier K30 (Bayer) and 300 g of a polystyrene seed having a mean particle diameter of 35 nm are initially taken and heated to 85° C. When the polymerization temperature was reached, 15 g of sodium persulfate were added and feeds I and II were started.

Feed I contained a monomer emulsion comprising 8.070 kg of water, 300 g of emulsifier K30, 750 g of butadiene, 13.5 kg of styrene, 750 g of acrylic acid and 90 g of tert-dodecylmercaptan.

Feed II contained 105 g of sodium persulfate and 1.748 kg of water. Feed I was added in the course of 5 hours and feed II in the course of 5.5 hours. After the end of feed I, the kettle was stirred for a further 2 hours at 85° C. It was then cooled, and the emulsion was deodorized.

A polymer powder was produced from the emulsion by spray drying.

The polymers from the example and from the comparative example were mixed with diisodecyl phthalate in a weight ratio of 10:7 (polymer:plasticizer).

In the case of the example, the mixture had a shelf life of more than 1 month at room temperature and did not gel. Heating to 150° C. gave a colorless, flexible, viscoelastic film which was nontacky and from which no plasticizer was exuded.

In the case of the comparative example, the mixture gelled overnight at room temperature, and films produced by heating to 150° C. were tacky. The plasticizer was exuded from the film.

In a further comparative example, an anionic polymer having the same composition as in the example but $M_n=214,070$ was prepared and was correspondingly mixed with a plasticizer.

This mixture, too, was not stable and gelled overnight.

We claim:

1. A plastisol comprising:
   (i) a plasticizer; and
   (ii) a polymer prepared by anionic polymerization and having a number average molecular weight of 300,000 to 10,000,000, comprising
      from 10 to 100% by weight of an ethylenically unsaturated vinylaromatic a),
      from 0 to 90% by weight of an aliphatic diene having two conjugated double bonds b) and
      from 0 to 30% by weight of further ethylenically unsaturated monomers c).

2. A plastisol as claimed in claim 1, comprising from 5 to 300% by weight, based on said polymer, of said plasticizer.

3. A plastisol as claimed in claim 1, further comprising fillers or pigments.

4. The plastisol as claimed in claim 1, wherein said number average molecular weight is from 700,000 to 5,000,000.

5. The plastisol as claimed in claim 1, wherein said polymer comprises:
   from 50 to 100% by weight of said a);
   from 0 to 30% by weight of said b); and
   from 0 to 20% by weight of said c).

6. The plastisol as claimed in claim 1, wherein said a) has up to 20 carbon atoms.

7. The plastisol as claimed in claim 6, wherein said a) is selected from the group consisting of styrene, α-methylstyrene, 3-methylstyrene, 4-n-propylstyrene, 1-vinylnaphthalene and 2-vinylnaphthalene.

8. The plastisol as claimed in claim 1, wherein said b) has 4–12 carbon atoms.

9. The plastisol as claimed in claim 8, wherein said b) is selected from the group consisting of isoprene, 2,3-dimethyl-1,3-butadiene, piperylene, 3-butyloctadiene and butadiene.

10. The plastisol as claimed in claim 1, wherein said c) has one or more functional groups selected from the group consisting of carboxyl, hydroxyl, thiol, primary amino and secondary amino functional groups.

11. The plastisol as claimed in claim 1, wherein said polymer further comprises from 0 to 10% by weight, based on the polymer, of a crosslinking compound.

12. The plastisol as claimed in claim 11, wherein said crosslinking compound has at least two nonconjugated double bonds.

13. The plastisol as claimed in claim 12, wherein said crosslinking compound is divinylbenzene.

14. The plastisol as claimed in claim 1, wherein said plasticizer is selected from the group consisting of alkanol esters of phthalic, adipic, sebacic, azelaic, citric and phosphoric acid, chlorohydrocarbons, liquid polyesters and epoxidized natural oils.

15. The plastisol as claimed in claim 14, wherein said epoxidized natural oils are linseed oil or soybean oil.

16. The plastisol as claimed in claim 14, wherein said plasticizer is selected from the group consisting of dibutylphthalate, dioctylphthalate, diisononylphthalate, butylbenzylphthalate, diisodecylphthalate and dibenzylphthalate.

17. The plastisol as claimed in claim 1, wherein said polymer is present as an emulsion in an aliphatic hydrocarbon.

18. The plastisol as claimed in claim 17, wherein said emulsion has a solids content of 20 to 70% by weight.

* * * * *